Patented May 21, 1946

2,400,547

UNITED STATES PATENT OFFICE 2,400,547

SUBSTITUTED 1,3,5-TRIAZINYL-(6)-AMINO-PHENYL-ARSENIC COMPOUNDS

Ernst A. H. Friedheim, New York, N. Y.

No Drawing. Application January 20, 1944, Serial No. 518,997

8 Claims. (Cl. 260—242)

This invention relates to derivatives of triazines containing arsenic, and more particularly to triazine derivatives which contain trivalent arsenic.

In my U. S. Patent No. 2,295,574 issued on September 15, 1942, I have shown that condensation of suitable derivatives of symmetric triazine with phenyl-arsonic acid derivatives results in a new type of condensation products possessing valuable therapeutic properties in diseases caused by spirochaetes or trypanosomes, such as syphilis, and African sleeping sickness.

I have found that new triazine derivatives containing arsenic can be obtained by condensing derivatives of 1,3,5-triazine of the formula

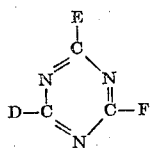

with an aromatic organic compound containing trivalent arsenic and corresponding to the formula W—C$_6$H$_2$(A,B)—As=X.

In these formulas, W is an amino-group or halogen. If W is an amino-group, at least one of the groups D, E, F, is a halogen-group. If W is a halogen, at least one of the groups D, E, F is an amino-group. In both cases the other groups are selected from the group consisting of halogen, NH$_2$, NH Alk., N Alk.$_2$, hydroxy-alkyl-amino, NHCH$_2$CHOHCH$_2$OH, dialkyl-amino-alkyl-amino, and aminoacyl radicals, such as NHCOCH$_3$ and NHCOC$_6$H$_5$; the radicals A and B are selected from the group consisting of hydrogen, halogen, OH, O Alk., O acyl, NO$_2$, NH$_2$, NH Alk., N Alk.$_2$, aminoacyl, and alkyl radicals; it is to be understood that in the appended claims the term "amino-radical" includes —NH$_2$— groups as well as the above mentioned substituted amino groups, and the term "hydroxyl" radical includes —OH radicals as well as the before mentioned substituted —OH radicals; X is a divalent group selected from the group consisting of O, S, dihalides, such as Cl$_2$, I$_2$ or Br$_2$, and sulfur-containing radicals of the type=(S—R)$_2$ wherein R is an organic radical which is capable of carrying an SH-radical. Such sulfur-containing reactants are, for example, thioglycollic acid, cysteine, or gluthathione, thiophenol. As examples of the trivalent arsenic compounds to be used according to my invention, the following may be mentioned: 4-amino-phenyl-arsinoxide, 4-chlor-phenylarsinoxide, 4-aminophenylarsindichloride, 4-amino-phenylarsinsulfide, 3-amino-4-oxy-phenylarsinoxide.

The condensation products thus formed have the formula

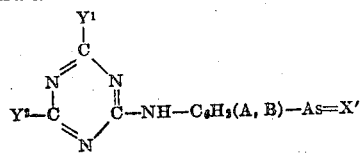

wherein Y$^1$ and Y$^2$ are each a radical selected from the group consisting of halogen, NH$_2$, NH Alk., N Alk.$_2$, hydroxy-alkyl-amino,

NHCH$_2$CHOHCH$_2$OH dialkyl-amino-alkyl-amino, and amino-acyl radicals; A and B are selected from the group consisting of hydrogen, halogen, OH, O Alk., O acyl, NO$_2$, NH$_2$, NH Alk., N Alk.$_2$, amino-acyl, and alkyl radicals, and X' is a divalent radical selected from the group consisting of O, S, dihalides, sulfur-containing groups of the type=(S—R)$_2$, wherein R is an organic radical which is capable of carrying an SH-radical, and groups having the formula

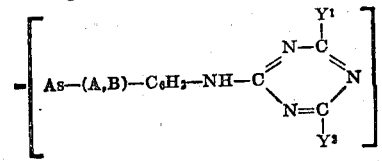

In carrying out the present invention, for example an aqueous solution containing one mol of 4-oxy-3-amino-phenyl-arsinoxide may be caused to react with a fine suspension of 1 mol of 2,4,6-trichloro-1,3,5-triazine in water at a temperature of 0° C. with the exclusion of oxygen. The resulting condensation product has the formula

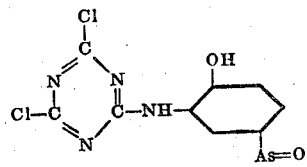

Subsequently, this reaction product may be treated with a base selected from the group consisting of ammonia, alkyl amines, hydroxy-alkyl amines and dialkyl-amino-alkyl amines in order to react these substances with the Cl atoms of the triazine ring. Similar reactions may be obtained by using a dihalide such as 4-aminophenylarsindichloride instead of 4-oxy-3-aminophenyl-arsinoxide. Instead of the latter, its derivatives or isomers, such as, for instance, 2-oxy-4-amino-phenyl-arsinoxide, or 4-amino-3-oxy-phenylarsinoxide may also be used. In carrying out these reactions, instead of the trichloro-triazine other derivatives of 1,3,5-triazine corresponding to the formula referred to above may also be used.

I have further found that the condensation products according to this invention may also be obtained by first forming a condensation product of the type disclosed in my above mentioned U. S. Patent No. 2,295,574 from a derivative of 1,3,5-triazine and a substituted phenyl-arsonic acid, and converting the condensation product thus obtained, into a compound containing trivalent arsenic. I have found that such conversion can be performed without the disintegration of the basic triazinyl-aminobenzene structure by treating the triazinyl-aminobenzene - arsonic acid condensation product in hydrochloric acid solution, in the presence of hydriodic acid, with $SO_2$, hypophosphorous acid ($H_2PO_3$), or stannous chloride, or in neutral or alkaline solution with phenyl-hydrazine or sodium hydrosulfite $Na_2S_2O_4$ The reduction with $SO_2$ or phenylhydrazine leads to the arsinoxides, or dihalogenarsines, while the treatment with stannous chloride, hypophosphorous acid, and sodium hydrosulfite leads to the corresponding arseno-compounds.

For example, one part by weight of 2,4-diamino - 1,3,5-triazinyl-(6)-[amino - 3 - oxy-4-phenylarsonic acid I] is dissolved at about 80° C. in 100 parts of hydrochloric acid of sp. gr. 1.19. To the clear, warm solution 1/50 part of sodium iodide is added, and a stream of $SO_2$ gas is allowed to pass through the solution. After a few minutes the solution becomes cloudy, and the hydrochloride of 2,4 - diamino-1,3,5 - triazinyl-(6)-oxyamino-phenyl arsindichloride separates out in crystalline form. It is soluble in ethyl alcohol from which it may be recrystallized. It  is slightly soluble in acetone, and insoluble in chloroform, $CCl_4$ and benzene. The corresponding arsinoxide is formed by the action of alkali, such as dilute ammonia or sodium bicarbonate on the arsindichloride.

An arseno-compound can be obtained by the action of stannous chloride on 2,4-diamino-triazinyl-(6)-[4-oxy - 3 - amino - phenylarsonic acid I]. One part of the latter is suspended in 50 parts of aqueous hydrochloric acid of 1.19 density containing about 50% stannous chloride, and 1% of hydriodic acid. On gentle warming the substance goes slowly into solution, the reaction mixture taking a yellow color. It becomes cloudy, and on standing a yellow precipitate separates, which represents the hydrochloride of the bis [2,2'-4,4'-tetraamino-triazinyl - (6-6')]-(3-3'-diamino-4-4' dioxyarsenobenzene) of the formula

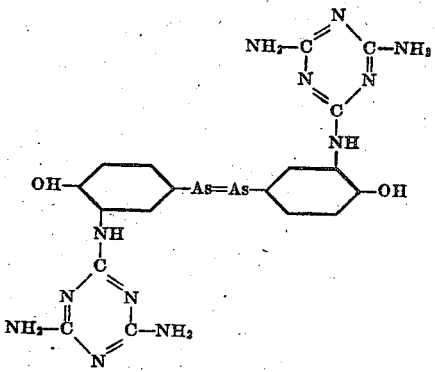

This compound is moderately soluble in dilute hydrochloric acid, and insoluble in ether and chloroform. In an entirely similar manner 2,4-diamino-triazinyl-(6)-[4-amino - phenylarsonic acid] may be subjected to reduction by means of a solution of stannous chloride in aqueous hydrochloric acid and converted into the corresponding arseno - compound, i. e. [2,2'-4,4'-tetraamino - triazinyl - (6,6')] - 4,4' - diamino-arsenobenzene.

If 1 part by weight of [2-chloro-4-amino-1,3,5-triazinyl-(6)]-4-aminophenyl-arsonic acid is suspended in about 50 parts by weight of aqueous hydrochloric acid of 1.19 density, containing about 50% stannous chloride and 1% of hydriodic acid and subjected to gentle warming, the suspended substance goes into solution. On standing, the hydrochloride of 2,2'-chloro-4,4'-amino-triazinyl-(6,6')-4,4' - diamino - arsenobenzene separates from the solution in the form of a yellow precipitate.

A substituted 1,3,5 - triazinyl - arsenobenzene compound containing in the triazine ring substituted amino-radicals may be obtained by subjecting p-[2,4 - dimethylamino-1,3,5-triazinyl-(6)]-aminophenyl-arsonic acid to reduction by means of sodium hydrosulfite ($Na_2S_2O_4$) in aqueous alkaline solution to a compound of the formula

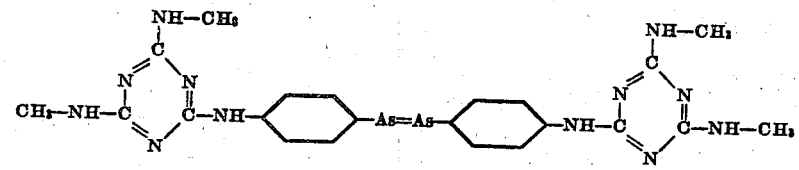

Other compounds according to my present invention may be obtained by applying the above described reduction process by means of stannous chloride, hypophosphorous acid, sodium hydrosulfite or phenylhydrazine to other arsonoanilino-triazine compounds.

A condensation product obtained from 3-chloro-4-amino-phenylarsonic acid and cyanuric chloride in the manner described in my above mentioned prior Patent 2,295,574, and corresponding to the formula

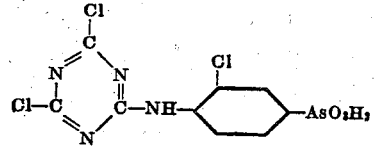

may be first reacted with ammonia in the manner described in said prior patent in order to replace one or both of the Cl-atoms of the triazine rings by —NH₂ groups, and then subjected to reduction by means of Na₂S₂O₄ in aqueous alkaline solution to form the corresponding arseno-compound. Instead of 3-chloro-4-aminophenylarsonic acid, 6-chloro-3-amino-phenylarsonic acid may be used in this example in a substantially similar manner.

4-amino-3-methyl-phenylarsonic acid and cyanuric chloride reacted in the manner described in U. S. Patent 2,295,574, form a condensation product corresponding to the formula

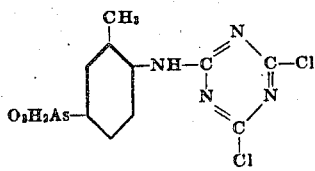

which can be reduced in hydrochloric acid solution by means of stannous chloride in the presence of a small amount of hydriodic acid to a compound of the formula

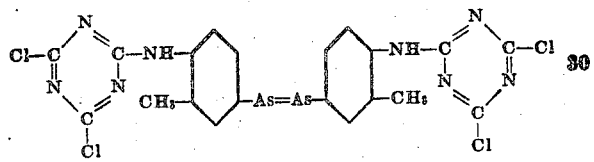

Triamino-triazine (melamine) can be reacted with 2-chloro-4-dimethylamino-phenylarsonic acid in the manner described in the U. S. Patent 2,295,574 to form a condensation product of the formula

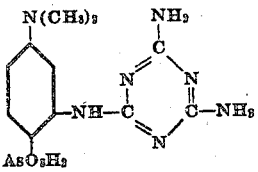

This condensation product may be converted by the action of hypophosphorous acid into the corresponding arseno-compound.

Condensation of 4-amino-3-nitro-phenylarsonic acid with cyanuric chloride and reduction of the condensation product thus formed by means of SnCl₂ in hydrochloric acid in the presence of a small amount of hydroiodic acid results in a compound of the formula

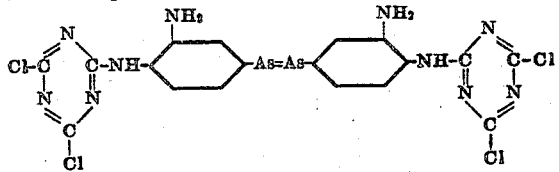

4-amino-3-methoxy-phenylarsonic acid may be reacted with one mol of cyanuric chloride substantially in the manner described in the U. S. Patent 2,295,574. Upon dissolving the condensation product thus formed in dilute aqueous sodium hydroxide and treating the solution with Na₂S₂O₄ a compound corresponding to the formula

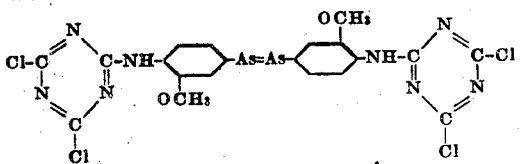

is formed.

As described in Example 2 of my U. S. Patent 2,295,574, p-[2,4-dichloro-1,3,5-triazinyl-(6)]-aminophenylarsonic acid may be treated with ammonia in order to convert it into a 2-chloro-4-amino-compound by covering said dichloro-compound with 10 times the quantity of 10% aqueous ammonia, and shaking at 45° C. for 1 hour, whereby the product goes into complete solution. By heating the [2-chloro-4-amino-1,3,5-triazinyl-(6)]-aminophenyl-arsonic compound in hydrochloric acid solution with SO₂, a compound having the formula

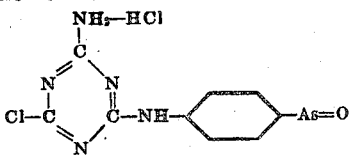

may be obtained.

Reference is made to my co-pending application Ser. No. 422,234, filed on December 9, 1941, of which this is a continuation in part.

I claim:

1. A 1,3,5-triazine derivative of the formula

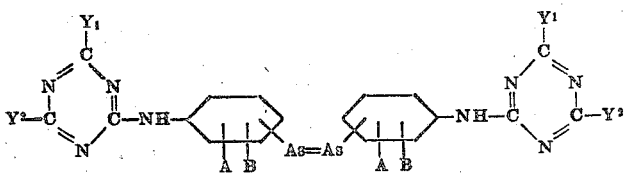

wherein Y¹ and Y² are each a radical selected from the group consisting of halogen, and amino-radicals; A and B are selected from the group consisting of hydrogen, halogen, hydroxyl, alkyl, and amino-radicals.

2. A 1,3,5-triazine derivative of the formula

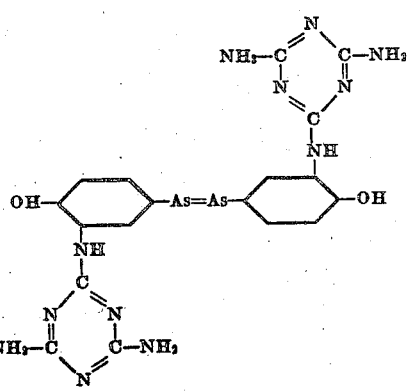

3. A 1,3,5-triazine derivative of the formula

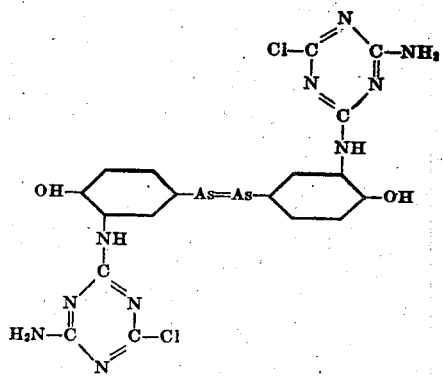

4. A 1,3,5-triazine compound of the formula

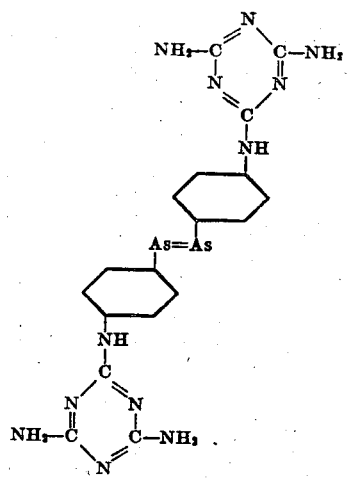

5. A process for the preparation of a 1,3,5-triazine compound of the formula

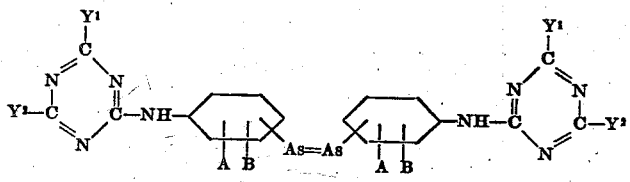

said process comprising subjecting in aqueous solution a 1,3,5-triazine derivative of the formula

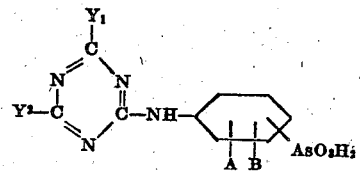

wherein $Y^1$ and $Y^2$ are each a radical selected from the group consisting of halogen, and amino-radicals; A and B are selected from the group consisting of hydrogen, halogen, hydroxyl, alkyl, and amino-radicals, to the action of a reducing agent selected from the group consisting of $SnCl_2$, $H_2PO_3$, and $Na_2S_2O_4$.

6. A process as claimed in claim 5, in which $H_2PO_3$ is used as a reducing agent in the presence of hydrochloric acid and a small amount of hydriodic acid.

7. A process as claimed in 5, in which $Na_2S_2O_4$ is used as a reducing agent in the presence of alkali.

8. A process as claimed in claim 5, in which $SnCl_2$ is used as a reducing agent in the presence of hydrochloric acid and a small amount of hydriodic acid.

ERNST A. H. FRIEDHEIM.